(12) United States Patent
Hannington

(10) Patent No.: US 7,453,634 B2
(45) Date of Patent: Nov. 18, 2008

(54) DISCONTINUOUS OR VARIABLE THICKNESS GAIN MODIFICATION COATING FOR PROJECTION FILM AND METHOD FOR MAKING SAME

(75) Inventor: Michael E. Hannington, Madison, OH (US)

(73) Assignee: Avery Dennison Corporation, Pasadena, CA (US)

( * ) Notice: Subject to any disclaimer, the term of this patent is extended or adjusted under 35 U.S.C. 154(b) by 254 days.

(21) Appl. No.: 11/074,887

(22) Filed: Mar. 7, 2005

(65) Prior Publication Data
US 2006/0198020 A1 Sep. 7, 2006

(51) Int. Cl.
G03B 21/60 (2006.01)
G03B 21/56 (2006.01)
(52) U.S. Cl. .................. 359/453; 359/452; 359/456; 359/460
(58) Field of Classification Search .................. 359/443, 359/452–456, 460
See application file for complete search history.

(56) References Cited

U.S. PATENT DOCUMENTS

| | | |
|---|---|---|
| 3,552,822 A | 1/1971 | Altman |
| 3,614,199 A | 10/1971 | Altman |
| 4,191,451 A | 3/1980 | Hodges |
| 4,338,165 A | 7/1982 | Vlahos |
| 4,505,967 A | 3/1985 | Bailey |
| 4,563,617 A | 1/1986 | Davidson |
| 4,645,301 A | 2/1987 | Orensteen et al. |
| 4,660,930 A | 4/1987 | van der Hoorn et al. |
| 4,682,853 A | 7/1987 | Broer et al. |
| 4,688,093 A | 8/1987 | van der Staak et al. |
| 4,767,186 A | 8/1988 | Bradley, Jr. et al. |
| 4,859,027 A | 8/1989 | Kishida |
| 4,897,136 A | 1/1990 | Bailey et al. |
| 4,904,526 A | 2/1990 | Koskenmaki |
| 5,026,599 A | 6/1991 | Koskenmaki |
| 5,064,272 A | 11/1991 | Bailey et al. |
| 5,066,099 A | 11/1991 | Yoshida et al. |
| 5,166,824 A | 11/1992 | Nishiguchi et al. |
| 5,241,416 A | 8/1993 | Mitsutake et al. |
| 5,485,308 A | 1/1996 | Hirata et al. |
| 5,563,738 A | 10/1996 | Vance |
| 5,625,489 A | 4/1997 | Glenn |
| 5,673,127 A | 9/1997 | Takahara et al. |
| 5,706,134 A | 1/1998 | Konno et al. |

(Continued)

FOREIGN PATENT DOCUMENTS

EP 143295 A1 12/1984

(Continued)

Primary Examiner—Diane I Lee
Assistant Examiner—Magda Cruz
(74) Attorney, Agent, or Firm—Renner, Otto, Boiselle & Sklar, LLP

(57) ABSTRACT

The present invention relates to projection films and methods of making the same. In particular, the present invention relates to a projection film whereby the microspheres exhibit improved alignment on the light exit surface and have alignment on the light entrance surface that varies according to the individual microsphere diameter. In another embodiment, the present invention relates to a projection film that has the attributes of variable gain within the single projection film. In another embodiment, the present invention relates to an exposed microsphere projection film construction that provides modification of the head-on and angular pattern of light transmission (gain).

9 Claims, 7 Drawing Sheets

U.S. PATENT DOCUMENTS

| | | |
|---|---|---|
| 5,781,344 A | 7/1998 | Vance |
| 5,812,316 A | 9/1998 | Ochi et al. |
| 5,812,317 A | 9/1998 | Billingsley et al. |
| 5,815,313 A | 9/1998 | Mitani et al. |
| 5,837,347 A | 11/1998 | Marecki |
| 5,870,224 A | 2/1999 | Saitoh et al. |
| 5,882,771 A | 3/1999 | Klein et al. |
| 5,962,121 A | 10/1999 | Mori |
| 5,984,479 A | 11/1999 | Ochi et al. |
| 5,988,822 A | 11/1999 | Abe et al. |
| 6,066,384 A | 5/2000 | Crandall |
| 6,096,159 A | 8/2000 | Ito et al. |
| 6,156,436 A | 12/2000 | Joseph et al. |
| 6,172,814 B1 | 1/2001 | Watanabe et al. |
| 6,204,971 B1 | 3/2001 | Morris et al. |
| 6,218,679 B1 | 4/2001 | Takahara et al. |
| 6,261,402 B1 | 7/2001 | Watanabe et al. |
| 6,262,840 B1 | 7/2001 | Watanabe et al. |
| 6,278,546 B1 | 8/2001 | Dubin et al. |
| 6,327,091 B1 | 12/2001 | Agano |
| 6,339,461 B1 | 1/2002 | Kashiwazaki et al. |
| 6,344,263 B1 | 2/2002 | Moshrefzadeh et al. |
| 6,432,328 B2 | 8/2002 | Hamanaka et al. |
| 6,461,718 B2 | 10/2002 | Mori |
| 6,466,368 B1 | 10/2002 | Piepel et al. |
| 6,502,943 B2 | 1/2003 | Nakamura et al. |
| 6,519,087 B2 | 2/2003 | Moshrefzadeh |
| 6,529,322 B1 | 3/2003 | Jones et al. |
| 6,535,264 B1 | 3/2003 | Imabayashi et al. |
| 6,535,333 B1 | 3/2003 | Piepel et al. |
| 6,552,848 B2 | 4/2003 | Kobayashi |
| 6,567,215 B2 | 5/2003 | Ballen et al. |
| 6,597,502 B2 | 7/2003 | Takahashi et al. |
| 6,600,599 B2 | 7/2003 | Hannington |
| RE38,245 E | 9/2003 | Morris et al. |
| 6,631,030 B2 | 10/2003 | Stevenson et al. |
| 6,632,508 B1 | 10/2003 | Pellerite et al. |
| 6,636,355 B2 | 10/2003 | Moshrefzadeh et al. |
| 6,661,552 B2 | 12/2003 | Hira |
| 6,671,093 B2 | 12/2003 | Nakamura |
| 6,692,647 B2 | 2/2004 | Moshrefzadeh et al. |
| 6,695,453 B2 * | 2/2004 | Hannington ................ 359/614 |
| 6,710,941 B2 | 3/2004 | Hennen et al. |
| 6,912,089 B2 * | 6/2005 | Nakagawa et al. .......... 359/599 |
| 2001/0001582 A1 | 5/2001 | Walker |
| 2001/0015846 A1 | 8/2001 | Morris et al. |
| 2002/0012166 A1 | 1/2002 | Nakamura |
| 2002/0034618 A1 | 3/2002 | Moshrefzadeh et al. |
| 2002/0044360 A1 | 4/2002 | Yoshida et al. |
| 2002/0109920 A1 * | 8/2002 | Hannington ................ 359/614 |
| 2002/0196516 A1 | 12/2002 | Hira |
| 2003/0137740 A1 * | 7/2003 | Hannington ................ 359/614 |
| 2004/0023019 A1 | 2/2004 | Vandenberg et al. |
| 2004/0090684 A1 | 5/2004 | Wolfe |
| 2004/0096627 A1 | 5/2004 | Hannington |

FOREIGN PATENT DOCUMENTS

| | | |
|---|---|---|
| EP | 1291709 A1 | 12/2003 |
| WO | 98/26313 | 6/1998 |
| WO | 99/37949 | 7/1999 |
| WO | 99/50710 | 10/1999 |
| WO | 99/64927 | 12/1999 |
| WO | 99/64928 | 12/1999 |
| WO | 01/51544 A2 | 7/2001 |

* cited by examiner

DISCONTINUOUS OR VARIABLE THICKNESS GAIN MODIFICATION COATING FOR PROJECTION FILM AND METHOD FOR MAKING SAME

FIELD OF THE INVENTION

The present invention relates to projection films for rear projection screens and the like, including monitors and methods of making same, and particularly to projection films exhibiting improved microsphere alignment on the light exit surface and projection films with variable gain within a single projection film.

BACKGROUND OF THE INVENTION

Projection films are used with rear projection screens and monitors for transmitting an image generated by a projector or the like located at the back of the screen to the viewer on the opposite side of the screen. The viewable image is generally affected by the amount of light transmitted through the screen. Generally, the construction of rear projection screens and monitors limit the amount of light transmitted through the screen or monitor to the viewer. It is thus desirable to have constructions that provide increased light throughput.

Generally, rear projection screens and monitors suffer from poor angularity resulting in difficulties in viewing a projected image unless the viewer is facing the viewing area of such a screen or monitor head-on. Angularity is the term used to describe the ability of a viewer to see a good image from the screen at angles other than those which are normal to the surface of the viewable screen. For example, as the viewer moves to the side of the viewing screen, the image quality is generally decreased. It is desirable to have projection screens and monitors which have improved angularity.

Projection films can be generally characterized by their performance parameters: resolution, gain, transmission, ambient light rejection, half gain angle, and contrast. All of these parameters are generally determined by the structure and materials used in construction of the projection film. The resolution of the projection film is determined, at least in part, by the size and spacing of minute transparent particles, commonly referred to as microspheres, (e.g., the more microspheres contained on a substrate generally means increased resolution of the projection film). The peak gain is a measure of the intensity of the light transmitted from the rear of the film to the viewer side of the film as a function of angle measured from normal incidence and is normalized with respect to a lambertian diffuser. It is determined at least in part, by the refractive index of the microspheres and the surrounding material. Ambient light rejection and contrast are affected by absorption of an opaque layer, which typically is used to embed the microspheres. The viewing angle of a particular film is defined as the angle at which the peak gain is reduced by 50%. Such angle is commonly referred to as the "half-gain angle". Contrast is a measurement of the difference in light intensity between the brightest white and the darkest black reproducible on the viewing side of the projection film.

An exemplary prior art projection film 10 is illustrated in FIG. 1. Typically, the prior art projection film 10 includes an optically clear support layer 12, a light absorbing layer 14 deposited over the optically clear support layer 12, a plurality of microspheres 16A-16F embedded in the light absorbing layer 14, and may optionally include a conformable coating layer (or gain modification coating layer) 18 deposited over the microspheres 16A-16F and/or the light absorbing layer 14. In operation, light is projected from a light source (not shown) and transmitted through the conformable coating layer 18, the microspheres 16A-16F, and the optically clear support layer 12 to the viewer. The light absorbing layer 14 absorbs the light not transmitted through the microspheres 16A-16F. In addition, the light absorbing layer 14 also absorbs ambient light incident on the optically clear support layer 12 from the viewer's side in an effort to minimize reflections to the viewer.

The conformable coating layer 18 provides a predictable light gain profile based on the refractive index of the microspheres and the refractive index and thickness of the conformable coating layer 18. As shown in FIG. 1, the conformable coating layer 18 is generally of substantially uniform thickness across the exposed surface of the microspheres 16A-16F. This uniform thickness modifies gain as well as improving the focus of the light entering the film in an effort to maximize the total light transmission through the pinhole at the light exit surface of the microsphere 16A-16F.

As shown in FIG. 1, when the microspheres 16A-16F are relatively uniform in diameter, the microspheres 16A-16F generally penetrate through the light absorbing layer 14 and into the optically clear support layer 12 at a uniform depth. When the microspheres 16A-16F have varying diameters, however, as shown in FIG. 2, the conventional method of embedding microspheres 16A-16H causes deeper penetration of the larger microspheres (e.g., 16B, 16D, 16F) through the light absorbing layer 14 and into the optically clear support layer 12. Smaller beads (e.g., 16A, 16C, 16E, 16G, and 16H) can show minimal or no penetration through the light absorbing layer 14, which essentially minimizes or eliminates light transmission through the smaller microspheres. Another drawback associated with conventional processing of microspheres having varying diameters is that the light absorbing layer 14, which is generally made up of a black thermoadhesive coating, may wick up the sides of the smaller microspheres (e.g., 16A, 16C, 16E, 16G, and 16H) during conventional processing and cause thin spots between the microspheres. These thin spots allow light to pass through the thinned interstitial coating instead of being focused through the microspheres. This leads to the appearance of bright spots between the microspheres. This defect is known as "punch-through". Punchthrough also has undesirable effects on the optical properties of gain and half-gain angle. Another drawback is that the thermoadhesive black coating of the light absorbing layer 14 can be transferred to the rolls of the embedding apparatus and re-transfer portions of the thermoadhesive black coating to the light entrance surface of the microspheres. Thus, there is a need to overcome the drawbacks set forth above and provide projection films having improved microsphere alignment on the light exit surface and projection films with variable gain within a single projection film.

SUMMARY OF THE INVENTION

The present invention is directed to projection films and methods of making the same. In one embodiment, the present invention relates to a projection film whereby the microspheres exhibit improved alignment on the light exit surface and have alignment on the light entrance surface that varies according to the individual microsphere diameter. In another embodiment, the present invention relates to a projection film that provides for variable gain within a single projection film. In another embodiment, the present invention relates to a projection film construction that provides modification of the head-on and angular pattern of light transmission (gain). In one embodiment, the present invention relates to a projection film including: a light absorbing layer having a front surface and a back surface; and transparent microspheres having a plurality of diameters embedded and substantially uniformly aligned in the front surface of the light absorbing layer, wherein the microspheres have a front surface and a back surface that provide light tunnels through the light absorbing layer and protrude from the back surface of the light absorbing layer.

In another embodiment, the present invention relates to a method of manufacturing a projection film including: (a) forming a first assembly including depositing a light absorbing layer having a front surface and a back surface over an optically clear support layer, wherein the front surface of the light absorbing layer is adhered to the optically clear support layer; depositing a monolayer of transparent microspheres having a plurality of diameters over the light absorbing layer, wherein the microspheres have a front surface and a back surface that provide light tunnels through the light absorbing layer and protrude from the back surface of the light absorbing layer; (b) forming a second assembly including a molding layer having a front surface and a back surface; (c) laminating the back surface of the microspheres containing layer of the first assembly to the front surface of the molding layer of the second assembly, whereby the molding layer proportionately conforms to the diameters of the plurality of microspheres, whereby the microspheres are embedded and substantially uniformly aligned in the light absorbing layer; and (d) removing the molding layer whereby the microspheres exhibit improved alignment on the light exit surface and alignment on the light entrance surface that varies according to the individual microsphere diameter.

In another embodiment, the present invention relates to a projection film including: a light absorbing layer having a front surface and a back surface; a layer of transparent microspheres embedded in the light absorbing layer, wherein the microspheres have a front surface and a back surface that provide light tunnels through the light absorbing layer and protrude from the back surface of the light absorbing layer; a layer of conformable coating of variable thickness formed over the back surface of the microspheres.

In yet another embodiment, the present invention relates to a method of manufacturing a projection film including the steps of: (a) forming a first assembly by depositing a light absorbing layer having a front surface and a back surface over an optically clear support layer, wherein the front surface of the light absorbing layer is adhered to the optically clear support layer; depositing a monolayer of transparent microspheres over the light absorbing layer, wherein the microspheres have a front surface and a back surface that provide light tunnels through the light absorbing layer and protrude from the back surface of the light absorbing layer; (b) forming a second assembly including a molding layer having a front surface and a back surface wherein the front surface of the molding layer is in contact with a conformable gain layer having a variable thickness; (c) laminating the back surface of the microspheres containing layer of the first assembly to the front surface of the conformable gain layer of the second assembly together using at least one of heat and pressure to form a projection film; and (d) removing the molding layer, whereby the projection film exhibits a variable gain.

In another embodiment, the present invention relates to a method of manufacturing a projection film including the steps of: (a) forming a first assembly by depositing a light absorbing layer having a front surface and a back surface over an optically clear support layer, wherein the front surface of the light absorbing layer is adhered to the optically clear support layer; depositing a monolayer of transparent microspheres over the light absorbing layer, wherein the microspheres have a front surface and a back surface that provide light tunnels through the light absorbing layer and protrude from the back surface of the light absorbing layer; (b) forming a second assembly including a molding layer having a front surface and a back surface wherein the front surface of the molding layer is in contact with one or more conformable coating layers at least one of the conformable coating layers being discontinuous; (c) laminating the back surface of the microspheres containing layer of the first assembly to the front surface of the conformable gain layer of the second assembly together using at least one of heat and pressure to form a projection film; and (d) removing the molding layer, whereby the projection film exhibits a variable gain.

In another embodiment, the present invention relates to a method of manufacturing a projection film including the steps of: (a) forming a first assembly by depositing a light absorbing layer having a front surface and a back surface over an optically clear support layer, wherein the front surface of the light absorbing layer is adhered to the optically clear support layer; depositing a monolayer of transparent microspheres over the light absorbing layer, wherein the microspheres have a front surface and a back surface that provide light tunnels through the light absorbing layer and protrude from the back surface of the light absorbing layer; (b) forming a second assembly including a molding layer having a front surface and a back surface wherein the front surface of the molding layer is in contact with one or more conformable coating layers at least one of the conformable coating layers having a variable thickness; (c) laminating the back surface of the microspheres containing layer of the first assembly to the front surface of the conformable gain layer of the second assembly together using at least one of heat and pressure to form a projection film; and (d) removing the molding layer, whereby the projection film exhibits a variable gain.

In another embodiment, the present invention relates to a method of manufacturing a projection film including the steps of: (a) forming a first assembly by depositing a light absorbing layer having a front surface and a back surface over an optically clear support layer, wherein the front surface of the light absorbing layer is adhered to the optically clear support layer; (b) forming a second assembly including a molding layer having a front surface and a back surface; (c) depositing a layer of microspheres over the front surface of the molding layer of the second assembly; wherein the microspheres have a front surface and a back surface and the back surface of the microspheres are adhered in the front surface of the molding layer of the second assembly; (d) laminating the front surface of the microsphere containing layer of the second assembly to the back surface of the light absorbing layer of the first assembly together using at least one of heat and pressure to form a projection film; and (e) removing the molding layer whereby the microspheres exhibit improved alignment on the light exit surface and alignment on the light entrance surface that varies according to the individual microsphere diameter.

In another embodiment, the present invention relates to a method of manufacturing a projection film including the steps of: (a) forming a first assembly by depositing a light absorbing layer having a front surface and a back surface over an optically clear support layer, wherein the front surface of the light absorbing layer is adhered to the optically clear support layer; (b) forming a second assembly including a molding layer having a front surface and a back surface wherein the front surface of the molding layer is in contact with a conformable gain layer having a variable thickness; (c) depositing a layer of microspheres over the conformable coating layer of the second assembly; wherein the microspheres have a front surface and a back surface and the back surface of the microspheres is partially embedded in the conformable coating layer of the second assembly; (d) laminating the front surface of the microspheres containing layer of the second assembly to the back surface of the light absorbing layer of the first assembly together using at least one of heat and pressure to form a projection film; and (e) removing the molding layer, whereby the projection film exhibits a variable gain.

In another embodiment, the present invention relates to a method of manufacturing a projection film including the steps of: (a) forming a first assembly by depositing a light absorbing layer having a front surface and a back surface over an optically clear support layer, wherein the front surface of the light absorbing layer is adhered to the optically clear support layer; depositing a monolayer of transparent microspheres over the light absorbing layer, wherein the microspheres have a front surface and a back surface that provide light tunnels through the light absorbing layer and protrude from the back surface of the light absorbing layer; (b) forming a second assembly including a molding layer having a front surface and a back surface wherein at least one segment is embedded in the front surface of the molding layer and a conformable coating layer having a front surface and a back surface is deposited on the second assembly; (c) laminating the back surface of the microspheres containing layer of the first assembly to the front surface of the conformable gain layer of the second assembly together using at least one of heat and pressure to form a projection film; and (d) removing the molding layer, whereby the projection film exhibits a variable gain.

BRIEF DESCRIPTION OF THE DRAWINGS

FIGS. 8A-7B are cross-sectional views illustrating another method of preparing the projection film in accordance with one aspect of the present invention.

DETAILED DESCRIPTION OF THE INVENTION

Figure 1:
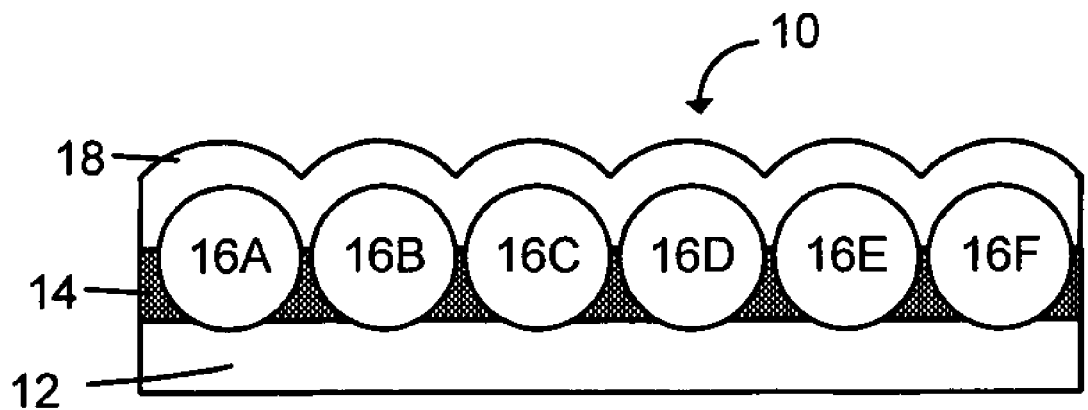
FIG. 1 is a cross-sectional view of a prior art projection film.
Figure 2:
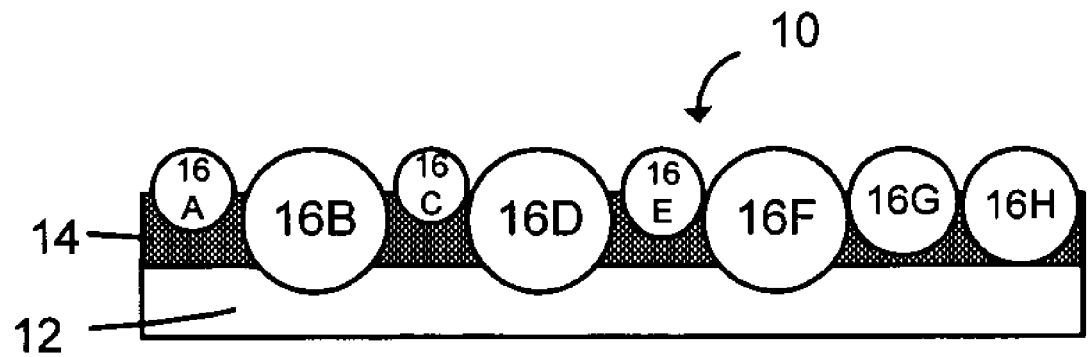
FIG. 2 is a cross-sectional view of a projection film having microspheres of varying diameters manufactured using conventional prior art methods.

As used in the specification and claims, the phrase substantially uniform layer refers to a layer of the construction which has a thickness with little variance, such as a generally variation in thickness of less than about 5 microns, preferably a variation of less than about 2.5 microns, or even more preferably less than about 1.25 microns. The term conformable coating layer refers to a layer that generally conforms in shape to the underlying layers and/or structures, including, for example, the protruding portions of the microspheres. Here and elsewhere in the specification, drawings and claims, the range and ratio limits may be combined.

The invention relates to a projection film that includes an optically clear layer, a light absorbing layer and microspheres embedded in at least a portion of the light absorbing layer. Optionally, the microspheres may also be partially embedded in the conformable coating. A molding layer may be laminated to an exposed rear surface of the microspheres using heat and pressure with the molding layer facing the exposed beads. The molding layer may surround the exposed surface of the microspheres preventing the thermoadhesive black coating from wicking up the sides of the microspheres. The molding layer can also push the thermoadhesive coating back down in to the interstitial areas (e.g., the area located between microspheres), if the thermoadhesive black coating has already wicked up the sides of the microspheres in a previous processing step. When microspheres of varying diameters are used in a projection film, the molding layer allows the larger microspheres to sink deeper into the molding layer and the smaller microspheres to sink less deep into the molding layer, which allows for improved alignment of the microspheres against, and possibly into the base substrate.

The invention also relates to coating or printing a variable thickness or discontinuous conformable coating layer (also known as a gain modifying coating) on a molding layer to provide modification of the head-on and angular pattern of light transmission (gain) for projection film and laminating the molding layer and conformable coating layer to an exposed surface of the microspheres using heat and/or pressure. In another embodiment, the microspheres may also be embedded into or on the molding layer, which provides an additional advantage of aligning the top of the microspheres so that the assembly can be subsequently laminated to the light absorbing layer and the optically clear support layer using heat and pressure. In another embodiment, the conformable coating (or gain modifying coating) can contain microspheres of differing refractive indices incorporated into the body of a continuous coating or hanging pendent therefrom.

The present invention also relates to an exposed microsphere (or bead) construction that has a higher half gain angle than conventional spherical systems. An increased half gain angle is accomplished by exposing the center of the transparent microspheres and having a conformable coating layer (gain modification coating) surrounding the exposed center of the microsphere (or bead).

The light absorbing layer (also referred to herein as the opaque layer) serves a number of purposes including fixing the microspheres (also commonly referred to as "beads"), reducing the reflectivity of the projection film, and reducing the amount of light transmitted from the back surface through the interstices between the microspheres in the system to the viewer. The light absorbing layer generally has a thickness sufficient for embedding the transparent microspheres. The embedding of the transparent microspheres may be at any level provided that the transparent microspheres form a light tunnel through the light absorbing layer. In one embodiment, the light absorbing layer has a thickness from about 10% to 60%, or from about 10% to about 40% of the transparent microsphere diameter. The light absorbing layer may be any material that is substantially opaque and can be embedded with the transparent microspheres to form light tunnels through the light absorbing layer. Likewise, the light absorbing layer may be any material that is malleable enough to yield when the transparent microspheres are pushed against it, such as a partially or incompletely crosslinked urethane, a pressure sensitive adhesive, or with the addition of heat, thermoplastic polymers. The light absorbing material may also be a material which can form around the transparent microsphere, such as an asphalt or adhesive (e.g., a pigmented pressure sensitive adhesive).

Typically, the light absorbing layer is a combination of one or more pigments, such as carbon black, or other colorant, and one or more polymers, including polyolefins, like polyacrylates, polyvinyl acetals such as polyvinyl butyral, (e.g., Butvar resins available from Solutia), polyurethanes, polyesters or polyvinylcarboxylates. The polyolefins may be homopolymers and copolymers of $C_{2-12}$ olefins, such as ethylene, propylene, and butylene. The polyacrylates, including polymethacrylates, may be homopolymers or copolymer of $C_{1-12}$ acrylate or methacrylate monomers, such as methyl, ethyl, propyl, butyl, hexyl, or octyl acrylates or methacrylates. Here and elsewhere in the specification and claims, the term for pendant groups is meant to include all isomeric forms of the group. For instance, the use of the term octyl is intended to cover n-octyl, isooctyl, and 2-ethylhexyl groups. The polyvinylcarboxylates include homo or copolymers of $C_{1-12}$ vinyl carboxylates, such as vinyl acetate, vinyl propionate and vinyl butyrate. Examples of useful commercially available polyacrylates include Acrylic HI-7 from ICI and Acrylic MI-7 from Rohm & Haas. The light absorbing layer may contain from about 2% to about 10% by weight of the pigment and/or colorant.

Alternatively, the light absorbing layer may be a photosensitive film, in which case its optical density can be varied by exposure to actinic electromagnetic radiation. Photochromic materials which automatically adjust their absorption in response to ambient light conditions also can be used. In addition to film and polymer type materials, the light absorbing layer may be a wire mesh or perforated metal sheet, or a combination of wire mesh and polymers.

Transparent microspheres are embedded into the light absorbing layer. Typically the transparent microspheres are embedded to a level sufficient to provide light tunnels through the light absorbing layer. Light tunnels are present when the microspheres are embedded sufficiently into the light absorbing layer so that portions of the microspheres are in contact with, and in some instances, may perforate the front surface of the light absorbing layer, and other portions of the microspheres protrude through the back surface of the light absorbing layer. Generally, the transparent microspheres are embedded at a level of about 10% to about 80%, and in one embodiment, less than about 50% (preferably from about 30% to about 40%) of their diameter.

The transparent microspheres generally have a refractive index from about 1.4 to 2.3, or from about 1.4 to about 2.2, or from about 1.45 to about 1.95. They are typically composed of glass, ceramic, plastic or other suitably transparent materials. The microspheres also may be composed of photochromic materials to allow their optical properties to respond to changes in incident light intensity. Alternatively, colored microspheres may be used to allow chromatic effects. Transparent microspheres having an average diameter of from about 25 to about 300 microns are suitable for construction of the projection films described herein. In one embodiment, the transparent microspheres have a diameter of about 30 to about 120 microns, or from about 40 to about 80 microns, or from about 50 to 65 microns. In one embodiment, the diameter of the microspheres are determined as average diameter for a given lot of microspheres. In another embodiment, the transparent microspheres are substantially uniform in size. In yet another embodiment, the transparent microspheres have diameters that vary in size. In another embodiment, the transparent microspheres have varying refractive indexes. In another embodiment microspheres of different diameters can be combined in a projection film to increase the packing density.

Furthermore, in some embodiments, it may be useful to use microspheres that are non-spherical in shape such as ellipsoids or rounded rods. These non-spherical shapes can be deposited in alignments that provide different optical properties in different directions. In yet another embodiment, the transparent microspheres are present in substantially a monolayer generally covering from 60% to about 91% of the surface area of the back surface light absorbing layer, or from about 75% to about 90%, or from about 85% to about 90% of the surface area of the back surface of the light absorbing layer.

The microspheres can be embedded in a close-pack array (e.g., high density of microspheres) using a number of well known processes. In one fabrication method, a removable support material such as paper or a polymer film is coated with a thermoplastic resin binder layer which is modified by colorant to adjust the binder layer to the desired opacity. Microspheres are then spread over the resin binder layer which is subsequently heated, allowing the microspheres to be pressed into the resin binder layer until the microspheres contact the surface of the support material. The microspheres may be also deposited by electrophoresis from a fluid medium by spraying a mixture of microspheres, material for the binder layer and a solvent onto a support material, or by spraying microspheres directly onto a softened resin binder layer. The microspheres may also be deposited on a molding layer.

Another component of the projection film of the invention is that the optically clear conformed layer. In one embodiment the conformable coating layer is substantially uniform in thickness. In another embodiment, the conformable coating layer is of varying thickness to provide the attributes of variable gain on a single projection film. The conformable coating layer typically has a thickness of about 10% to about 90% of the diameter of the average microsphere, or from about 20% to about 80% of the diameter of the average microsphere, or from about 30% to about 70% of the diameter of the average microsphere. In one embodiment, the conformed layer has an average thickness of from about 2.5 microns to about 270 microns. In another embodiment, the thickness is from about 7.5 microns to about 75 microns. The conformed layer comprises any polymer which has the optical clarity needed for projection film. Typically these polymers are polyolefins, such as optically clear polyolefins from metallocene catalysts, polyacrylates, polymethacrylates, polycarbonates, polyurethanes, polyesters, such as polyethylene terephthates, polyvinylidene dichloride, cellophane, cellulose acetate, polyvinylidene difluorides, polyvinyl chlorides, polyvinyl acetals, and polyvinylcarboxylates. Generally, the front surface of the conformed layer is adhered to the back surface of the light absorbing layer and the microspheres which protrude from the back surface of the light absorbing layer.

The back surface of the conformable coating layer of optically clear material may have a textured finish which results in reduced speckling, as discussed in U.S. Pat. No. 6,695,453, which is incorporated by reference as if fully rewritten herein. It is believed that the textured finish scatters reflected light with minimal effect on total light transmission thereby reducing speckling. In one embodiment, the textured finish may be a random microstructured surface such as a matte finish, or the finish may contain a pattern of three-dimensional microstructures having cross sections made up of very small circles, ovals, diamonds, squares, rectangles, triangles, polygons, lines, or irregular shapes when the cross section is taken parallel to the surface of the light absorbing material. The textured finish can be, in some instances, a holographic image embossed into the surface of the film.

Several procedures and techniques are known to those skilled in the art for producing textured finishes on surfaces which can be used to form the textured finish on the back surface of the conformed layer. For example, the back surface of a conformable layer of optically clear material may be textured, prior to being conformed to the microspheres, by contact with a film or paper having a textured or matte finish. The finish on the film is replicated on the surface of the conformable layer when the two surfaces are joined by pressure. Alternatively the desired surface of the conformable layer deposited on, e.g., a release liner, can be textured by passing the construction through heated rollers, at least one of which has a textured surface.

In another method, the image can be imparted to the back surface of the conformed layer by first printing an image or textured surface onto the face of a polymer coated surface of a casting sheet. The printing can be done using common printing techniques such as Flexography (Flexo) and Rotogravure (gravure). Heat and pressure are used to press the image into the face of the polymer coated casting sheet so that the top of the print is substantially level with the polymer coated surface. The conformable layer is then applied over the textured surface such as by lamination thereby replicating the textured or printed surface on the back surface of the conformable layer.

The microspheres that protrude from the back surface of the light absorbing layer have a center of curvature (e.g., the center point on the outside surface of the microsphere furthest in distance from the light absorbing layer), and the back surface of the conformable coating layer also has a center of curvature. In one embodiment the center of curvature of the back surface of the conformable coating layer of optically clear material is behind the center of curvature of the microspheres. This alignment increases convergence of the light into the microspheres. In another embodiment, the center of curvature of the back surface of the conformable layer is about equal to the center of curvature of the microspheres thereby increasing convergences of light into the microspheres. In yet another embodiment, the conformable layer does not extend to the center of curvature of the microspheres.

The conformed layer of optically clear material provides a preliminary stage of convergence of the light into the microspheres. Also, it is believed that positioning the centers of curvature of the back surface of the conformable coating layer behind the centers of curvature of the microspheres increases convergence of such light into the microspheres, and converges the light nearer the ideal angles for refraction of the light through the transmission areas in front of the microspheres.

In one embodiment, the front surface of the light absorbing layer may be supported by an optically clear support layer to improve the sturdiness of the projection film. The optically clear support layer may be a glass or a polymer. The optically clear support layer generally resists the pressure exerted by the transparent microspheres during the embedding and conforming processes. The optically clear support layer may be adhered to the light absorbing layer by an adhesive, by lamination, or as a result of coextrusion. The optically clear support layer may be any material having sufficient strength to provide support to the light absorbing layer and having optically clear characteristics. Examples of support layers include glass, polymethyl methacrylate, polyacrylics, polycarbonates, polyurethanes, such as two part polyurethanes, polyesters, such as polyethylene terephthalates, and any of the materials described above as useful in the conformed layer of optically clear materials.

Another component of the projection film is a molding layer. Since the projection films are generally manufactured through heat lamination, it is desirable that the Vicat softening point of the polymer of the light absorbing layer is higher than the Vicat softening point of the polymer of the molding layer. The molding layer is generally partially in contact with the microspheres and/or portions of the light absorbing layer during preparation of the projection film. The molding layer may be any thermoplastic polymer with the appropriate Vicat softening point. If the molding layer is composed of a polymer of similar nature to the light absorbing layer then a layer of silicone release layer, such as those used for pressure sensitive adhesive liners, may be used to enhance ease of separation of the layers. In one embodiment, the molding layer is composed of polyolefins, such as low, medium and high density polyethylene, propylene or mixtures thereof. The lower Vicat softening point of the molding layers helps conform the molding layer to the microspheres and the light absorbing layer. Under the pressure and temperature of preparation, the molding layer presses the microspheres and light absorbing layer against the optically clear support layer.

The methods of making the projection films of the invention may be through heat lamination. In one embodiment it is desirable that a substantially uniform conformable layer is formed on the transparent microspheres. In another embodiment, the conformable coating layer is of varying thickness to provide the attributes of variable gain on a single projection film. In one embodiment, it is desirable that the Vicat softening point of the polymer of the conformable layer is higher than the Vicat softening point of the polymer of the molding layer. The molding layer is in contact with the conformable coating layer during preparation of the projection film. The molding layer may be any thermoplastic polymer with the appropriate Vicat softening point. If the molding layer is composed of a polymer of similar nature to the conformable layer then a layer of silicone release layer, such as those used for pressure sensitive adhesive liners, may be used to enhance ease of separation of the layers. In one embodiment, the molding layer is composed of polyolefins, such as low, medium and high density polyethylene, propylene or mixtures thereof. The lower Vicat softening point of the molding layers helps form the conformable layer by softening and/or melting to conform to the surface of the transparent microspheres. Under the pressure and temperature of preparation, the molding layer presses the conformable layer against the transparent microspheres.

In one embodiment, the projection films of the invention can be prepared by the steps of: (1) providing a first assembly comprising a light absorbing layer having a front surface and a back surface wherein the front surface is adhered to an optically clear support layer and a monolayer of transparent microspheres embedded in the light absorbing layer, wherein the microspheres provide light tunnels through the light absorbing layer and protrude from the back surface of the light absorbing layer; (2) providing a second assembly comprising a molding layer having a front surface and a back surface wherein the front surface of the molding layer is in contact with the back surface of the microspheres and/or the light absorbing layer; (3) laminating the back surface of the microsphere containing layer of the first assembly to the front surface of the molding layer of the second assembly, whereby the molding layer highly conforms to the microspheres and/or the light absorbing layer; (4) removing the molding layer whereby the microspheres exhibit improved alignment on the light exit surface and alignment on the light entrance surface that varies according to the individual microsphere diameter.

In another method, the projection films can be prepared by the steps of: (1) providing a first assembly comprising a monolayer of microspheres, a light absorbing layer, and an optically clear support layer; (2) providing a second assembly comprising a molding layer having a front surface and a back surface wherein the front surface of the molding layer is in contact with a conformable gain layer having a variable thickness; (3) laminating the first and second assemblies together using at least one of heat and pressure; (4) removing the molding layer.

In another method, the projection films of the invention can be prepared by the steps of: (1) providing a first assembly comprising monolayer of microspheres, a conformable gain layer having a variable thickness; and a molding layer having a front and a back surface; (2) providing a second assembly comprising a light absorbing layer, and an optically clear support layer; (3) laminating the first and second assemblies together using at least one of heat and pressure; and (4) removing the molding layer.

In another method, the projection films of the invention can be prepared by the steps of: (1) providing a first assembly comprising a monolayer of microspheres deposited over a molding layer having a front and a back surface; (2) applying at least one of heat and pressure to the first assembly in order for the microspheres to slightly penetrate the molding layer; (3) depositing an optically clear layer over the layer of microspheres so that the optically clear at least partially fills the interstitial areas between the microspheres; (4) providing a second assembly comprising a light absorbing layer, and an optically clear support layer; (5) laminating the first and second assemblies together using at least one of heat and pressure; and 6) stripping the first assembly containing the molding layer from the second assembly, containing the microspheres wherein a surface having exposed center portion of microspheres and the areas between the microspheres have an optically clear conformed coating.

The invention may be further understood by reference to the attached figures. In these figures, the top of each construction is sometimes referred to as the "front" and the bottom is sometimes referred to as the "back" of the construction. Accordingly the surface of each layer closest to the top or front of the construction is referred to as the "upper surface" or the "front surface" and the surface of each layer closest to the bottom or back of the construction is referred to as the "back surface" or the "lower surface". In use, the light enters the filters of the invention from the back surface, and the light is emitted from the front surface.

Figure 3:
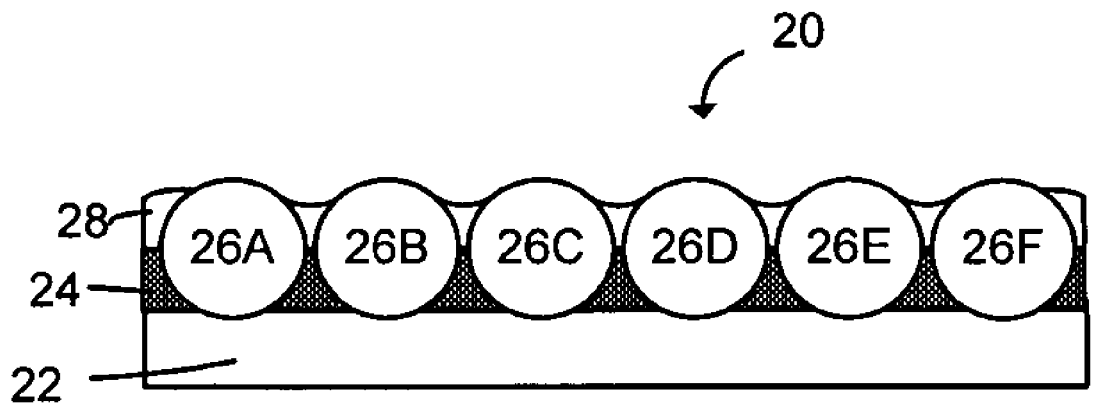
FIG. 3 is a cross-sectional view of a projection film in accordance with one aspect of the present invention.

FIG. 3 is a cross-section of projection film 20 in accordance with the invention. Projection film 20 includes an optically clear support layer 22 (e.g., a polyacrylate or polyurethane), a light absorbing layer 24 (e.g., polyvinylbutyral or a thermoplastic polyurethane containing carbon black) deposited over the optically clear support layer 22, transparent microspheres 26A-26F, and a conformable coating layer 28. The transparent microspheres 26A-26F are embedded in the light absorbing layer 24 and may contact or perforate the front surface of the optically clear support layer 22. Thus, the transparent microspheres 26A-26F are aligned along and/or into the substrate layer 22. The conformable coating layer 28 is formed above the light absorbing layer 24 and generally between the transparent microspheres 26A-26F, leaving the centers of the transparent microspheres 26A-26F exposed.

Figure 4A:
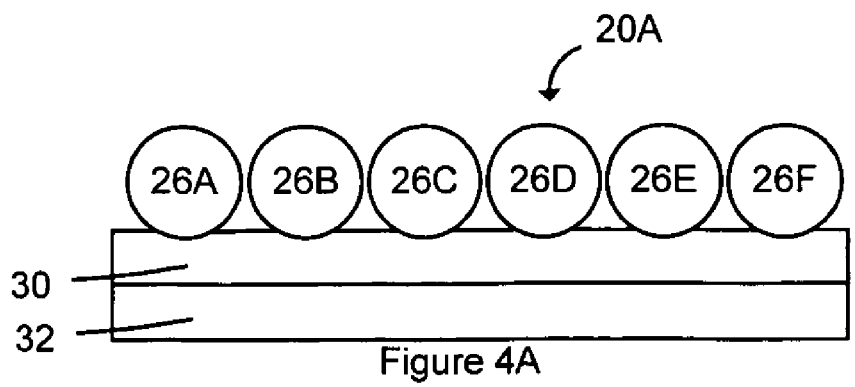
FIGS. 4A-4D are cross-sectional views illustrating one method of preparing the projection film in accordance with one aspect of the present invention.
Figure 4B:
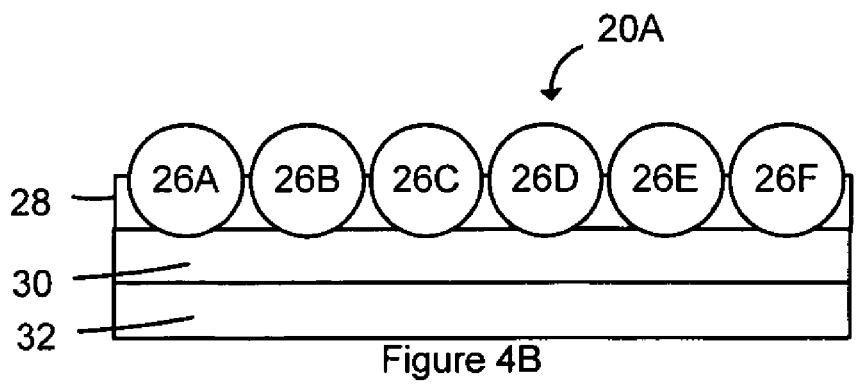
Figure 4C:
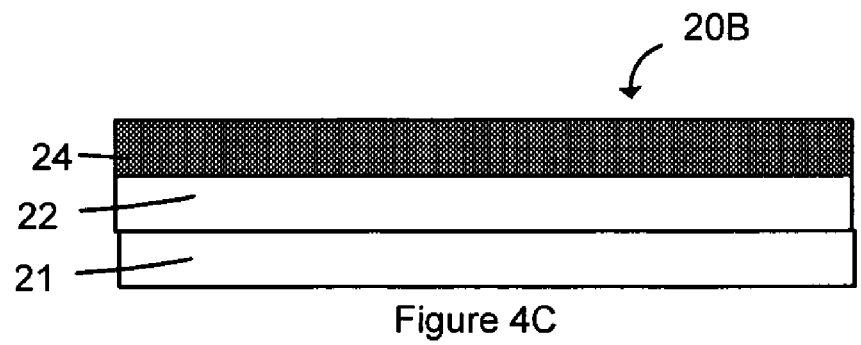

FIGS. 4A-4D illustrate one method for preparing the projection film 20 of the invention. As shown in FIG. 4A, a first construction 20A is provided. The construction 20A includes a monolayer of transparent microspheres 26A-26F deposited over a molding layer 30 and a support layer 32 (e.g., typically paper or a PET film). Infrared heat is used to sink the transparent microspheres 26A-26F into the molding layer 32. The transparent microspheres 26A-26F are top coated with a low percent solids solution of B-90 polyvinylbutyral (PVB) to yield a dry thickness of one-third to one-half the height of the transparent microsphere, which is identified as conformable coating layer 28, as shown in FIG. 4B. A second assembly 20B is provided, as shown in FIG. 4C. The second assembly 20B includes a light absorbing layer 24 deposited over an optically clear support layer 22 and optionally may include a removable support layer 21 (e.g. typically coated paper or a PET film).

Figure 4D:
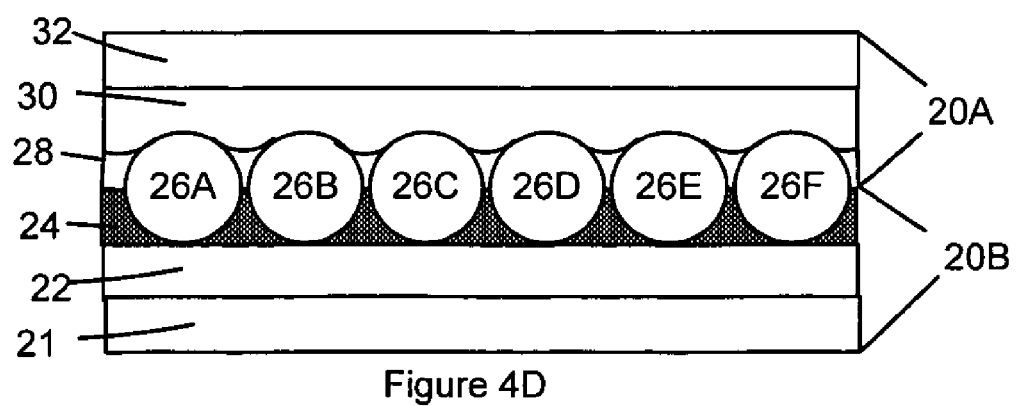

As shown in FIG. 4D, the first assembly 20A and second assembly 20B may be laminated together using heat and/or pressure, which causes the conformable coating layer 28 to conform in the areas between the exposed front surface of the open microspheres and the opposite surface of the microsphere to push through the light absorbing layer 24, thereby forming light tunnels through the light absorbing layer 24. The microspheres 26A-26F may be pushed completely through the light absorbing layer 24 and partially into the optically clear support layer 22. The molding layer 32 and removable support layers 21 and 32 may then be stripped, which yields a surface with the center portions of the microspheres exposed and the areas between the microspheres having a conformed coating, as shown in FIG. 3.

Figure 5A:
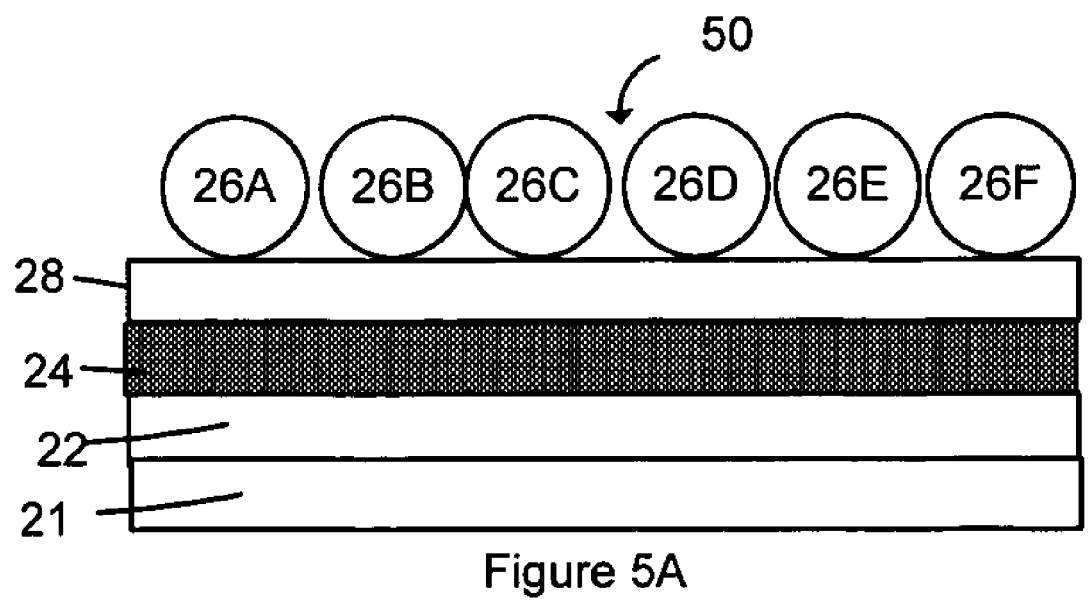
FIGS. 5A-5B are cross-sectional views illustrating another method of preparing the projection film in accordance with one aspect of the present invention.
Figure 5B:
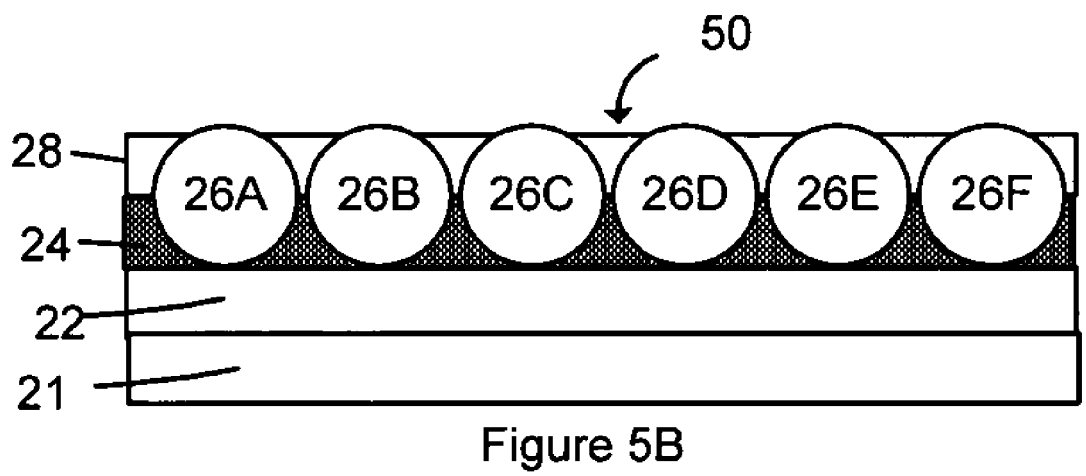

FIG. 5 illustrates another method for preparing the projection film 20 of the invention. As shown in FIG. 5A, a construction 50 includes a light absorbing layer 24 deposited over an optically clear support layer 22. A conformable coating layer 28 is deposited over the light absorbing layer 24. Microspheres 26A-26F are embedded using any conventional embedding method. As shown in FIG. 5B, when the microspheres 26A-26F are embedded, the microspheres 26A-26F push through the conformable coating layer 28 and the light absorbing layer 24, thereby forming light tunnels through the light absorbing layer 24. The conformable coating layer 28 is displaced to the area between the microspheres 26A-26F. The removable support layer 21 may be removed, which yields a surface with the center portions of the microspheres exposed and the areas between the microspheres having a conformed coating, as shown in FIG. 3. Although not shown, the conformation of the coating in the areas between the microspheres 26A-26F may be enhanced by lamination of a suitable molding layer during the embedding step or in a subsequent step.

Figure 6A:
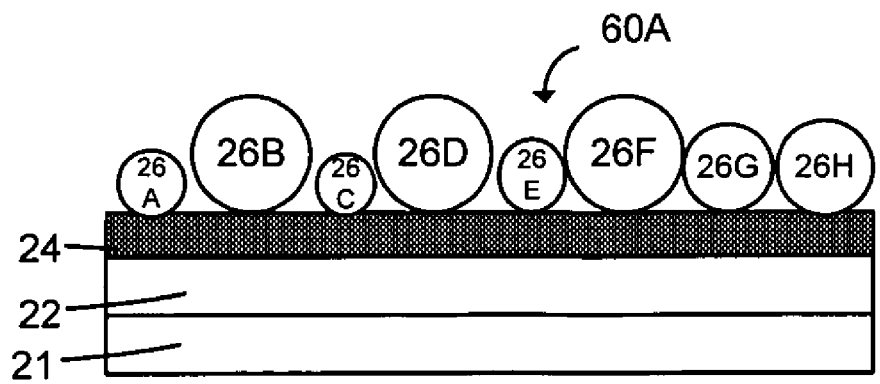
FIGS. 6A-6E are cross-sectional views illustrating another method of preparing the projection film in accordance with one aspect of the present invention.
Figure 6B:
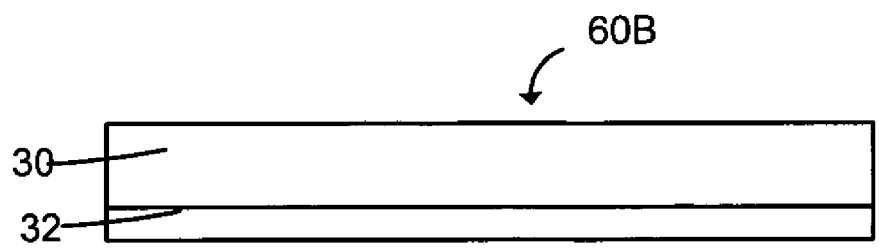
Figure 6C:
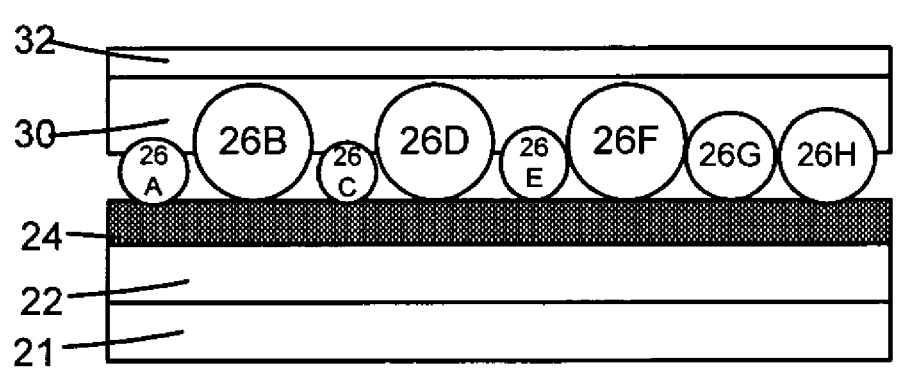
Figure 6D:
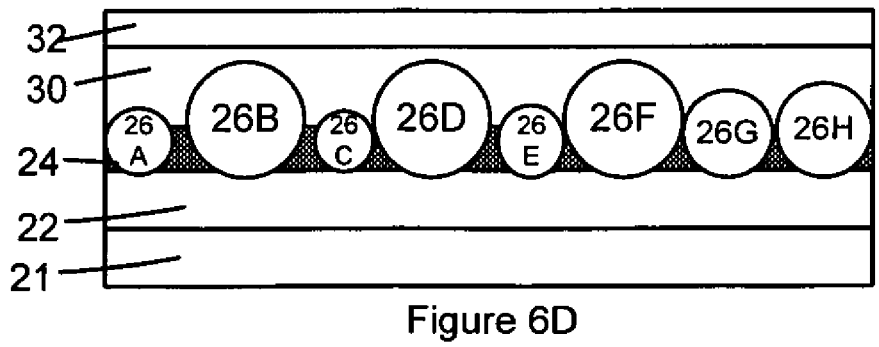
Figure 6E:
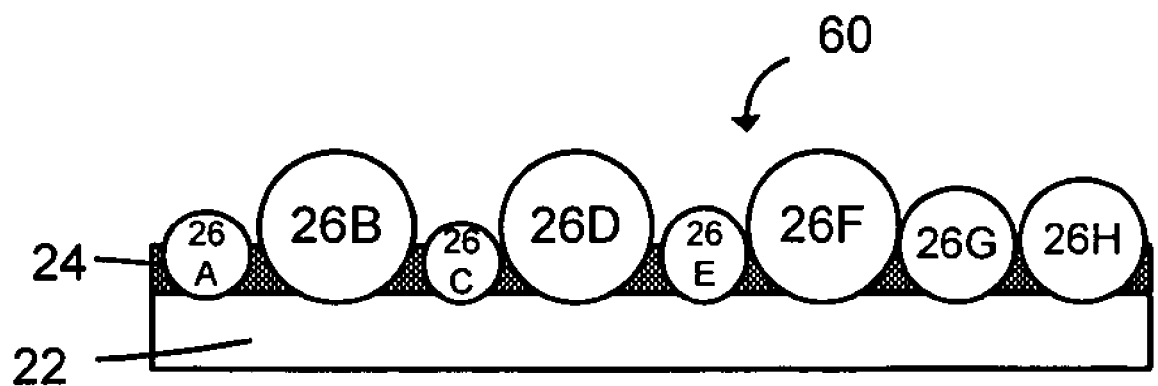

FIGS. 6A-6E represent another embodiment of the invention wherein the transparent microspheres 26A-26H have a varying diameter. As shown in FIG. 6A, a construction 60A includes a light absorbing layer 24 deposited over optically clear support layer 22. Microspheres 26A-26H are deposited over the light absorbing layer 24 using any conventional embedding and/or depositing method. FIG. 6B illustrates a construction 60B that includes a molding layer 30 and a support layer 32. The construction 60B is then laminated or exposed to heat in order for the molding layer 30 to substantially conform to the exposed surface of the microspheres 26A-26H, as shown in FIG. 6C. The molding layer 30 surrounds the exposed surface of the microspheres 26A-26H and prevents the thermoadhesive light absorbing layer 24 from wicking up the sides of the microspheres 26A-26F. The molding layer 30 can also push the thermoadhesive light absorbing layer 24 back in to the interstitial areas if it has already wicked in a previous processing step. In addition, the molding layer 30 also allows larger microspheres (e.g., 26B, 26D, and 26F) to sink deeper into the molding layer 30 and smaller microspheres (e.g., 26A, 26C, 26E, 26G, and 26H) to sink less deep into the molding layer 30, thereby allowing for the improved alignment of the surface of the microspheres that are embedded in the light absorbing layer 24 and pushed up against and/or into the optically clear support layer 22, as shown in FIG. 6D. The molding layer 32 and support layers 21 and 32 may then be stripped, which yields an improved projection film 60 with improved alignment of the surface of the microspheres that are embedded in the light absorbing layer 24 and pushed up against and/or into the optically clear support layer 22, as shown in FIG. 6E. Although not shown, a conformable coating layer 28 may be deposited on the projection film 60 or any of the constructions 60A and/or 60B during any step of the process set forth above.

The following are examples of the preparation of the projection films in accordance with certain aspects of the invention. These examples are illustrative and are not be considered limiting to the scope of the invention. Unless otherwise indicated in the examples and elsewhere in the specification and claims, temperatures are in degrees centigrade, parts and percentages are by weight, and pressure is at or above atmospheric pressure.

EXAMPLE 1

A first substrate is provided that includes a 75 micron (3 mil) layer of polyethylene terephthalate (SH-71 Polyester film from SKC America) laminated to a 50 micron (2 mil) layer of polymethylmethacrylate (Acrylic HI-7 from ICI). A 15 micron (0.6 mil) layer of black polyvinyl butyral (Butvar B-90 from Solutia containing 3% carbon black) is deposited above the polymethylmethacrylate. Glass microspheres having a varying refractive index of about 1.4 to 2.0 and having an average diameter varying from 40-70 microns are beaded on the polyvinylbutyral layer of the first substrate. A second substrate is provided that includes a 150 micron paper facestock coated with a 37.5 micron low density polyethylene (e.g., Felix Schoeller Technical Paper F315L). The first and second constructions are pressed together (laminated) (black polyvinylbutyral layer with exposed microspheres of construction 1 to the low density polyethylene layer of construction 2) at a temperature of 285° F. (140° C.) and 100 psi using a roll laminator.

EXAMPLE 2

A first substrate is provided that includes a 150 micron (6 mil) layer of polyethylene terephthalate (SH-71 Polyester film from SKC America) laminated to a 37.5 micron (1.5 mil) layer of pigmented low density polyethylene is beaded with glass microspheres having a varying refractive index of about 1.4 to 2.0 and having an average diameter varying from 40-70 microns. A second substrate is provided that includes a 50 micron (2 mil) layer of polyethylene terephthalate (SH-71 Polyester film from SKC America), a 30 micron (1.2 mil) of clear Urethane and 15 micron (0.6 mil) layer of black polyvinyl butyral (Butvar B-90 from Solutia containing 3% carbon black) is deposited above the clear Urethane. The first and second constructions are pressed together (laminated) (black polyvinylbutyral layer with clear Urethane of construction 2 to the low density polyethylene layer with exposed microspheres of construction 2) at a temperature of 285° F. (140° C.) and 100 psi using a roll laminator.

Figure 7A:
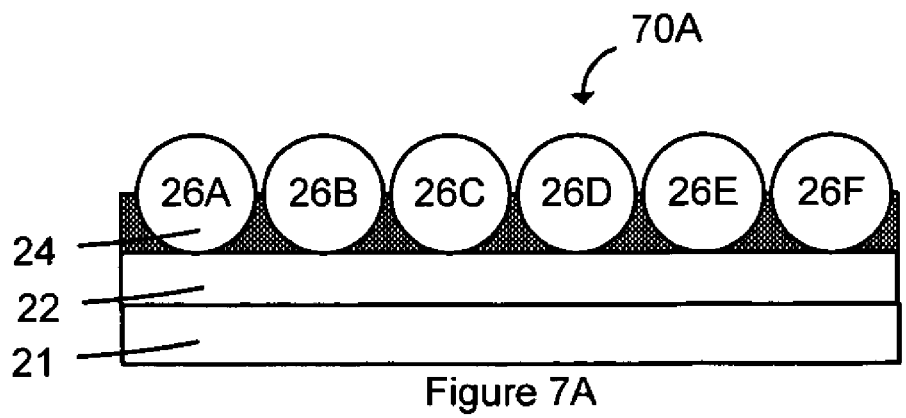
FIGS. 7A-7D are cross-sectional views illustrating another method of preparing the projection film in accordance with one aspect of the present invention.
Figure 7B:
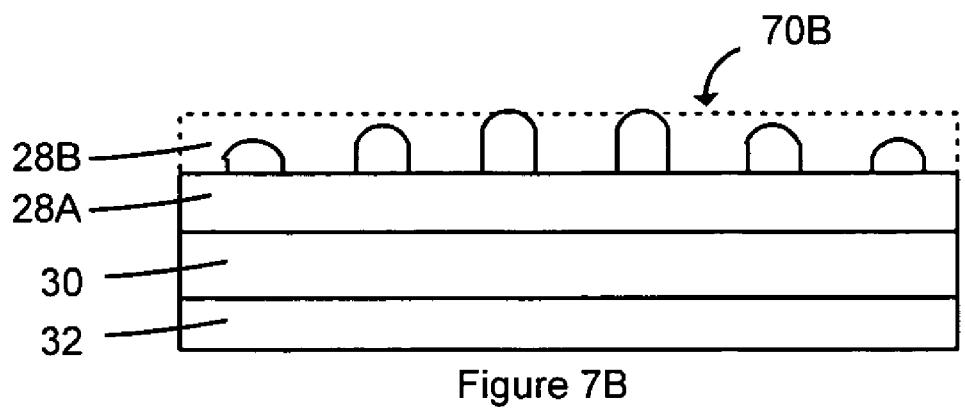
Figure 7C:
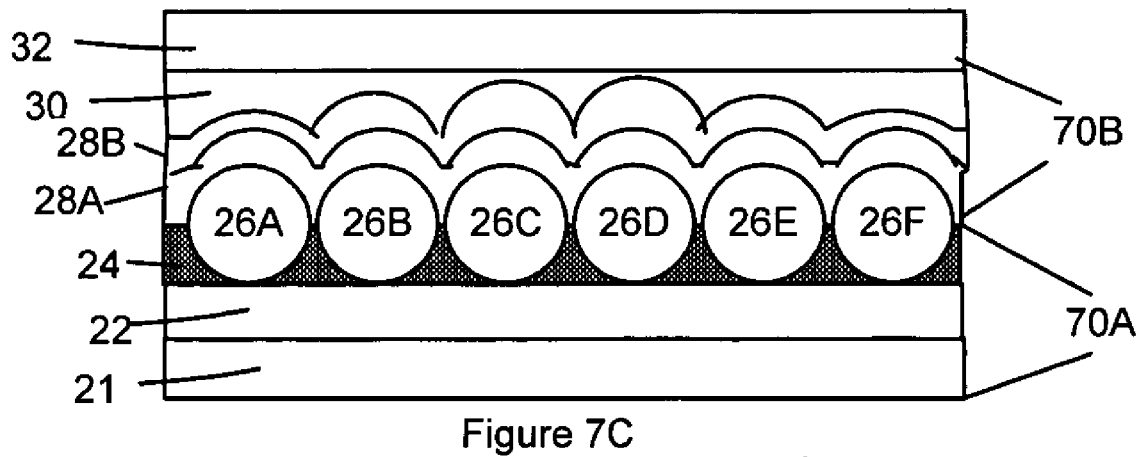
Figure 7D:
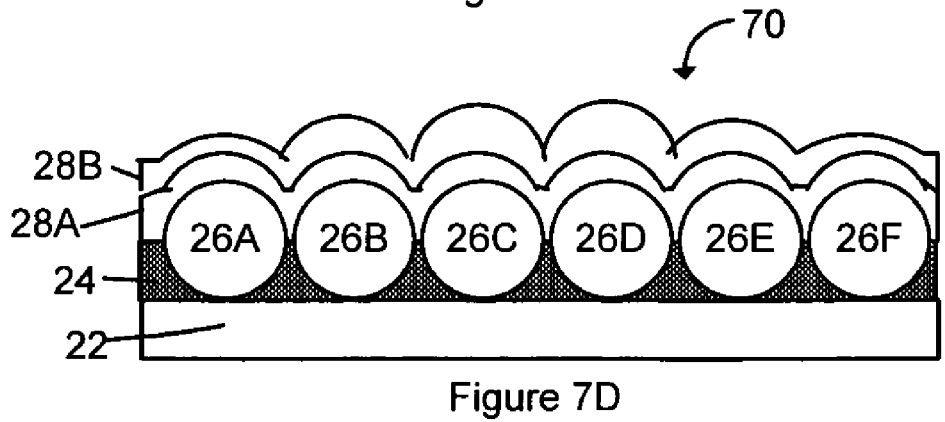

Referring now to FIGS. 7A-7D, another embodiment of the invention is illustrated. A construction 70A includes a light absorbing layer 24 deposited over an optically clear support layer 22 and optionally may include a removable support layer 21 (e.g. typically coated paper or a PET film). Microspheres 26A-26F are deposited over the light absorbing layer 24 using any conventional embedding and/or depositing method, as discussed above. As shown in FIG. 7B, a construction 70B includes a molding layer 30, a removable support layer 32, a uniform conformable coating layer 28A, a discontinuous conformable coating layer 28B. Since increasing the thickness of the conformable coating increases the gain, the discontinuous conformable coating layer 28B may be used to provide attributes of variable gain within a single projection film. Although not shown, the conformable coating layers 28A and 28B may be combined single pattern layer that has a variable thickness. The variable thickness may be achieved by using specialty coating methods or printing methods. Common printing techniques include Flexography (flexo) and Rotogravure (gravure). As shown in FIG. 7C, the constructions 70A and 70B are laminated together using heating and/or pressure. Upon lamination, the conformable coating layers 28A and 28B conform to the exposed surface of the open microspheres 26A-26F. The discontinuous conformable coating layer 28B provides a increased thickness of the conformable coating layer on the projection film 70 substantially corresponding to portions of the conformable coating layer 28B with increased conformable coating. Although not shown, another aspect of the invention is to embed the microspheres 26A-26F directly with a single layer of discontinuous conformable coating or with multiple layers of continuous and/or discontinuous conformable coating. The molding layer 32 and removable support layers 21 and 32 may then be stripped.

Figure 8A:
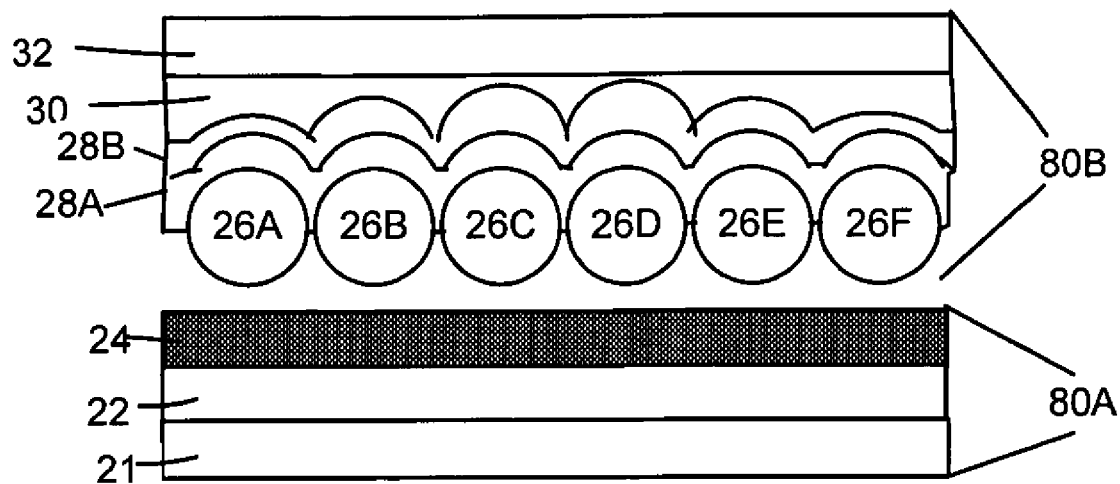
Figure 8B:
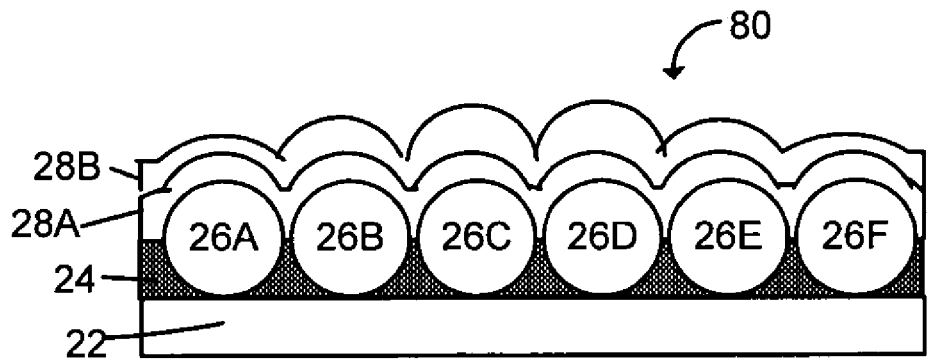

FIGS. 8A-8B represent another method for preparing the projection film 80 in accordance with the invention. As shown in FIG. 8A, construction 80 includes a light absorbing layer 24 deposited over an optically clear support layer 22 and optionally may include a removable support layer 21 (e.g. typically paper or a PET film). The construction 80B is identical to construction 70B discussed above, except that the construction is beaded with microspheres 26A-26F and embedded. An advantage associated with this embodiment is the aligning of the tops of microspheres 26A-26F, so that the assembly can be subsequently laminated to the black side of thermoplastic black on PMMA/PET using heat and pressure. The constructions 80A and 80B are laminated together using heating and/or pressure, the molding layer 32 and removable support layers 21 and 32 may then be stripped, which yields projection film 80, as shown in FIG. 8B.

Figure 9:
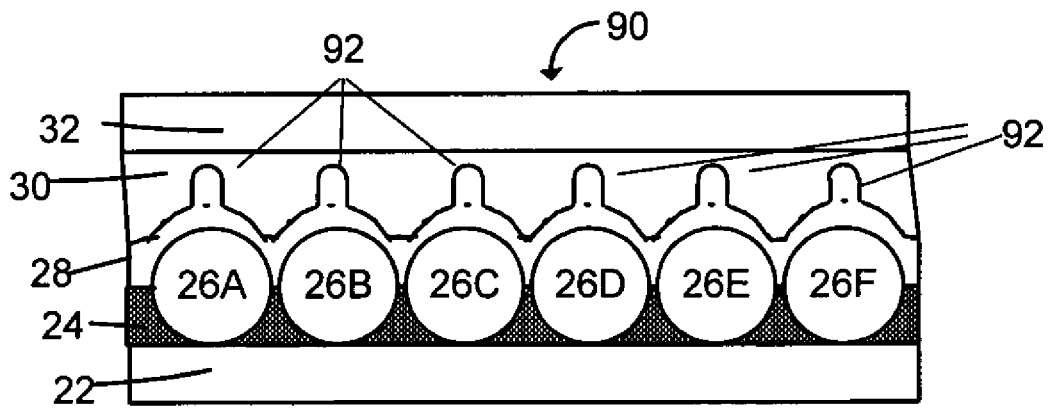
FIG. 9 is a cross-sectional view illustrating another method of preparing the projection film in accordance with one aspect of the present invention.

FIG. 9 represents another method for preparing the projection film 90 in accordance with the invention. As shown in FIG. 9, the conformable coating layer 28 may contain segments 92 of differing refractive indices either incorporated into the body of a continuous coating or hanging pendent from conformable coating layer 28. Methods of manufacturing the projection 90 include embedding the segments 92 in the molding layer 30 using at least one of heat and pressure. The conformable coating layer 28 of desired thickness is extruded or cast onto the molding layer 30 containing embedded segments 92. The construction including a removable support layer 32, molding layer 30, segments 92 and conformable coating layer 28 is laminated over a construction that includes a light absorbing layer 24 deposited over optically clear support layer 22, and a removable support layer 21 (not shown). Other methods for manufacturing and embedding segments 92 are discussed in U.S. Pat. No. 6,500,526, which is incorporated by references as if fully rewritten herein.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A projection film comprising:
   a light absorbing layer having a front surface and a back surface;
   a layer of transparent microspheres embedded in the light absorbing layer, wherein the microspheres have a front surface and a back surface that provide light tunnels through the light absorbing layer and protrude from the back surface of the light absorbing layer;
   a layer of conformable coating of variable thickness formed over the back surface of the microspheres.

2. The projection film of claim 1, wherein the front surface of the light absorbing layer is adhered to an optically clear support layer.

3. The projection film of claim 2, wherein the microspheres perforate the light absorbing layer and are substantially uniformly aligned in the optically clear support layer.

4. The projection film of claim 2, wherein the optically clear support layer includes a polyester, a polyurethane, or a polymethacrylate.

5. The projection film of claim 1, wherein the conformable coating layer has a thickness that varies within a range of about 2.5 microns to about 270 microns.

6. The projection film of claim 1, wherein the microspheres have a refractive index ranging from about 1.4 to about 2.3.

7. A method of manufacturing a projection film comprising the steps of:
   (a) forming a first assembly by depositing a light absorbing layer having a front surface and a back surface over an optically clear support layer, wherein the front surface of the light absorbing layer is adhered to the optically clear support layer; depositing a monolayer of transparent microspheres over the light absorbing layer, wherein the microspheres have a front surface and a back surface that provide light tunnels through the light absorbing layer and protrude from the back surface of the light absorbing layer;
   (b) forming a second assembly including a molding layer having a front surface and a back surface wherein the front surface of the molding layer is in contact with a conformable gain layer having a variable thickness;
   (c) laminating the back surface of the microspheres containing layer of the first assembly to the front surface of the conformable gain layer of the second assembly together using at least one of heat and pressure to form a projection film; and
   (d) removing the molding layer, whereby the projection film exhibits a variable gain.

8. A method of manufacturing a projection film comprising the steps of:
   (a) forming a first assembly by depositing a light absorbing layer having a front surface and a back surface over an optically clear support layer, wherein the front surface of the light absorbing layer is adhered to the optically clear support layer; depositing a monolayer of transparent microspheres over the light absorbing layer, wherein the microspheres have a front surface and a back surface that provide light tunnels through the light absorbing layer and protrude from the back surface of the light absorbing layer;
   (b) forming a second assembly including a molding layer having a front surface and a back surface wherein the front surface of the molding layer is in contact with one or more conformable coating layers at least one of the conformable coating layers being discontinuous;
   (c) laminating the back surface of the microspheres containing layer of the first assembly to the front surface of the conformable gain layer of the second assembly together using at least one of heat and pressure to form a projection film; and
   (d) removing the molding layer, whereby the projection film exhibits a variable gain.

9. A method of manufacturing a projection film comprising the steps of:
   (a) forming a first assembly by depositing a light absorbing layer having a front surface and a back surface over an optically clear support layer, wherein the front surface of the light absorbing layer is adhered to the optically clear support layer; depositing a monolayer of transparent microspheres over the light absorbing layer, wherein the microspheres have a front surface and a back surface that provide light tunnels through the light absorbing layer and protrude from the back surface of the light absorbing layer;
   (b) forming a second assembly including a molding layer having a front surface and a back surface wherein the front surface of the molding layer is in contact with one or more conformable coating layers at least one of the conformable coating layers having a variable thickness;
   (c) laminating the back surface of the microspheres containing layer of the first assembly to the front surface of the conformable gain layer of the second assembly together using at least one of heat and pressure to form a projection film; and
   (d) removing the molding layer, whereby the projection film exhibits a variable gain.

* * * * *